(12) United States Patent
Jaffrey

(10) Patent No.: US 10,954,138 B2
(45) Date of Patent: Mar. 23, 2021

(54) LIQUID PURIFICATION WITH FILM HEATING

(71) Applicant: Breakthrough Technologies, LLC, Boston, MA (US)

(72) Inventor: Kamal Jaffrey, Winchester, MA (US)

(73) Assignee: BREAKTHROUGH TECHNOLOGIES, LLC, Boston, MA (US)

( * ) Notice: Subject to any disclaimer, the term of this patent is extended or adjusted under 35 U.S.C. 154(b) by 0 days.

(21) Appl. No.: 15/573,294

(22) PCT Filed: May 13, 2016

(86) PCT No.: PCT/US2016/032427
§ 371 (c)(1),
(2) Date: Nov. 10, 2017

(87) PCT Pub. No.: WO2016/183471
PCT Pub. Date: Nov. 17, 2016

(65) Prior Publication Data
US 2018/0134578 A1 May 17, 2018

Related U.S. Application Data

(60) Provisional application No. 62/160,664, filed on May 13, 2015.

(51) Int. Cl.
*C02F 1/08* (2006.01)
*B01D 1/22* (2006.01)
(Continued)

(52) U.S. Cl.
CPC .............. *C02F 1/08* (2013.01); *B01D 1/0017* (2013.01); *B01D 1/0035* (2013.01);
(Continued)

(58) Field of Classification Search
CPC .. B01D 1/0017; B01D 1/0035; B01D 1/0047; B01D 1/0058; B01D 1/0082; B01D 1/22;
(Continued)

(56) References Cited

U.S. PATENT DOCUMENTS 2,607,661 A * 8/1952 See ..................... B01D 1/14
126/360.1
3,056,587 A * 10/1962 Steigerwald ............ F22B 37/02
392/324
(Continued)

FOREIGN PATENT DOCUMENTS

CN 102674490 A * 9/2012 ........... Y02A 20/128
JP S-478049 3/1972
(Continued)

OTHER PUBLICATIONS

CN102674490A_ENG (Espacenet machine translation of Xiao) (Year: 2012).*
(Continued)

*Primary Examiner* — Jonathan Miller
*Assistant Examiner* — Gabriel E Gitman
(74) *Attorney, Agent, or Firm* — Mintz, Levin, Cohn, Ferris, Glovsky and Popeo, P.C.

(57) ABSTRACT

A purification system can provide for efficient heating of liquid via film heating, which, rather than heating a large volume of liquid, can heat a thin layer of liquid thus reducing the amount of energy required to evaporate the liquid. Film heating can enable evaporation of liquids using less energy than other methods. In addition, when liquids (e.g., seawater) having dissolved solids (e.g., salts) are heated, both the liquid and the solids must be heated. As evaporation occurs, the concentration of solids increases and more energy must be supplied to the liquid in order to cause evaporation. Because purification system can heat only a layer of liquid,
(Continued)

less energy is required to heat the solids, which can allow for higher energy efficiencies in purifying liquids. These efficiencies can lead to decreased cost of potable water. Related apparatus, systems, techniques, and articles are also described.

24 Claims, 8 Drawing Sheets

(51) Int. Cl.
    *C02F 1/14*     (2006.01)
    *B01D 1/00*     (2006.01)
    *C02F 1/16*     (2006.01)
    *B01D 5/00*     (2006.01)
    *C02F 103/08*     (2006.01)

(52) U.S. Cl.
    CPC ......... *B01D 1/0047* (2013.01); *B01D 1/0058* (2013.01); *B01D 1/0082* (2013.01); *B01D 1/22* (2013.01); *B01D 5/006* (2013.01); *C02F 1/14* (2013.01); *C02F 1/16* (2013.01); *B01D 1/0005* (2013.01); *C02F 2103/08* (2013.01); *Y02A 20/211* (2018.01); *Y02A 20/212* (2018.01); *Y02W 10/37* (2015.05)

(58) Field of Classification Search
    CPC ... B01D 5/006; C02F 1/08; C02F 1/14; C02F 1/16; C02F 2103/08; Y02A 20/211; Y02A 20/212; Y02W 10/37
    See application file for complete search history.

(56) References Cited

U.S. PATENT DOCUMENTS

| | | | | |
|---|---|---|---|---|
| 3,247,888 A * | 4/1966 | Mueller | ............... | B01D 1/30 159/13.2 |
| 4,233,134 A | 11/1980 | King | | |
| 5,053,110 A | 10/1991 | Deutsch | | |
| 5,203,993 A * | 4/1993 | Arbisi | ............... | B01D 1/0011 137/386 |
| 5,940,578 A * | 8/1999 | Goddard | ............... | B01D 1/0005 392/337 |
| 6,303,005 B1 * | 10/2001 | Lautenschlager | .... | B01D 1/0011 137/386 |
| 6,592,107 B1 * | 7/2003 | Wong | ............... | C02F 1/14 202/83 |
| 6,789,371 B1 * | 9/2004 | Buysman | ............... | B29C 65/229 53/373.7 |
| 7,008,515 B1 * | 3/2006 | Husson, Jr. | ............... | B01D 1/0005 202/83 |
| 2004/0060808 A1 | 4/2004 | Laviolette | | |
| 2009/0120779 A1 * | 5/2009 | Strain | ............... | B01D 5/006 202/234 |
| 2009/0173617 A1 | 7/2009 | Wilson | | |
| 2009/0230039 A1 * | 9/2009 | Hoenig | ............... | C02F 1/48 210/150 |
| 2010/0000943 A1 * | 1/2010 | Carson | ............... | B01D 1/0094 210/638 |
| 2013/0240345 A1 | 9/2013 | Lautenschlaeger | | |
| 2014/0014277 A1 * | 1/2014 | Clark | ............... | B01D 1/0088 159/16.1 |
| 2014/0102965 A1 * | 4/2014 | Jones | ............... | C02F 1/02 210/136 |
| 2014/0305788 A1 * | 10/2014 | Matsushima | ............... | B01D 5/006 203/10 |
| 2014/0314947 A1 * | 10/2014 | Varanasi | ............... | B05D 7/22 427/9 |

FOREIGN PATENT DOCUMENTS

| | | | | |
|---|---|---|---|---|
| JP | H04260489 A | | 9/1992 | |
| JP | 2004-154691 A | | 6/2004 | |
| JP | 2013-121585 A | | 6/2013 | |
| JP | 2013-139007 A | | 7/2013 | |
| JP | 2013139007 A | * | 7/2013 | ............... B01D 1/00 |
| SU | 1139937 A1 | * | 2/1985 | ........... Y02A 20/128 |
| WO | WO2010/042971 A1 | * | 4/2010 | ................. C02F 1/10 |
| WO | WO2010042971 A1 | * | 4/2010 | ................. C02F 1/10 |
| WO | WO-2010042971 A1 | | 4/2010 | |

OTHER PUBLICATIONS

SU1139937A1_ENG (Espacenet machine translation of Lipshits) (Year: 1985).*
Shahriari et al. (2014, Heat transfer enhancement accompanying Leidenfrost state suppression at ultrahigh temperatures. Langmuir, 30(40), 12074-12081) (Year: 2014).*
JP2013139007A_ENG (Espacenet machine translation of Matssura) (Year: 2013).*

* cited by examiner

LIQUID PURIFICATION WITH FILM HEATING

RELATED APPLICATIONS

This application is a national stage application filed under 35 U.S.C. § 371, of International Patent Application No. PCT/US2016/032427, filed May 13, 2016, which claims the benefit of and priority under 35 U.S.C. § 119(e) to U.S. Provisional Application No. 62/160,664, filed May 13, 2015, the entire contents of which are hereby expressly incorporated by reference herein.

TECHNICAL FIELD

The subject matter described herein relates to liquid purification using, for example, thermal film heating and evaporation.

BACKGROUND

Desalination, desalinization, and desalinisation refer to any of several processes that remove some amount of salt and other minerals from saline water. Desalination is a form of purifying liquid, specifically, water. Salt water can be desalinated to produce fresh water suitable for human consumption, irrigation, or other uses. Due to relatively high-energy consumption, the costs of desalinating seawater are generally higher than the alternatives (e.g., fresh water from rivers or groundwater, water recycling, water conservation, and the like), but alternatives are not always available.

One example approach to desalination is low-temperature thermal desalination (LTTD), which takes advantage of water boiling at low pressures. Vacuum pumps create a low-pressure, low-temperature environment in which water can boil at a temperature gradient of 8-10° C. (46-50° F.) between two volumes of water. Cooling ocean water can be supplied and pumped through coils to condense water vapor and produce purified water. Another approach is reverse osmosis, which is a water purification technology that uses a semipermeable membrane to remove larger particles from drinking water.

However, producing potable water with existing systems and techniques is expensive. LTTD requires deep-ocean access and the capability to pump water from deep in the ocean. Reverse osmosis uses expensive membranes and high-pressures must be created, which requires significant energy.

SUMMARY

The problems associated with previous approaches to desalination can be solved by the current subject matter described herein. A purification system can provide for efficient heating of liquid via film heating, which occurs when a temperature difference between a heating element and liquid boiling point is greater than or equal to 93° Celsius. Film heating can result in a thin film of vapor bubbles forming on the heating element, also known as the Leidenfrost effect. This film of vapor can affect evaporation efficiencies because the vapor film can act as an insulator and reduce the effective surface area of the heating layer thereby keeping the liquid from forming vapors rapidly. In some implementations, the current subject matter can impart a charge on liquid and/or vapor molecules in proximity to the heating element. In combination with an oppositely charged element, charging of liquid and/or vapor molecules can result in the charged liquid and/or vapor molecules being pulled away from heating element thereby avoiding formation of a vapor film.

In an aspect, an apparatus for liquid purification includes a vapor canopy and a heating layer. The vapor canopy is for collecting vapor. The heating layer is below the vapor canopy and adapted to be submerged within a liquid such that it is substantially surrounded by the liquid and located at a depth between 1 millimeter and 20 millimeters from a surface of the liquid. The heating layer is further adapted to heat to a temperature of at least 93 degrees Celsius greater than a boiling point of the liquid.

In another aspect, a high total dissolved solids (TDS) liquid is provided to a heating layer arranged below a vapor canopy such that the heating layer is submerged within the high TDS liquid such that it is substantially surrounded by the high TDS liquid and located at a depth between 1 millimeter and 20 millimeters from a surface of the high TDS liquid. The heating layer is heated to a temperature of at least 93 degrees Celsius greater than a boiling point of the high TDS liquid to create vapor. Vapor is collected with the vapor canopy and a condenser.

One or more of the following features can be included in any feasible combination. For example, a vessel for holding the liquid can be included. The heating layer can be contained within the vessel. A float can be coupled to the heating layer and suspend the heating layer within the liquid so that the depth of the heating layer remains substantially constant regardless of a volume of the liquid. The float can further couple to the vapor canopy and support the vapor canopy over the liquid. The vapor canopy can be adapted to float on a body of water.

The heating layer can include at least one heating element. The heating element can include an electrical heating element, a gas heating element, a forced hot liquid heating element, an infrared absorbing material, or an electromagnetic absorbing material. The heating layer can further include a charging element that imparts a charge on liquid or vapor molecules in proximity to the heating layer. An oppositely charged element can be included to pull charged liquid or vapor molecules away from the heating layer and resist formation of a vapor film on the heating layer. The heating layer can include a hybrid heating-charging element that includes a heating element, a charging fin, and an insulation layer between the heating element and the charging fin. The insulation layer can be electrically insulating and thermally conductive. The heating layer can be adapted to be submerged within the liquid at a depth between 1 millimeter and 20 millimeters from a surface of the liquid, or between 5 millimeters and 14 millimeters from a surface of the liquid. For example, the heating layer can be adapted to be submerged within the liquid (or can be positioned within the liquid) at a depth of about 1, 2, 3, 4, 5, 6, 7, 8, 9, 10, 11, 12, 13, 14, 15, 16, 17, 18, 19, and/or 20 millimeters.

A heating source can be included. The heating source can include an infrared source, an electromagnetic source, or an electric source. The heating source can include an infrared source and the heating layer can include an infrared absorbing material. The liquid can be sea water, waste water, or brackish water. The heating layer can be adapted to heat to a temperature of at least 193 degrees Celsius. An input supply can be adapted to control a surface level of the liquid.

The vapor can be charged using a charging element to avoid formation of a vapor layer on the heating layer. The heating layer can be submerged within the liquid at a depth of about 14 millimeters. Providing a high TDS liquid can include placing the vapor canopy and heating element in a body of sea water.

Using the current subject matter, film heating can enable evaporation of liquids using less energy than other methods because formation of a vapor film can be avoided. In addition, rather than heating a large volume of liquid, a thin layer of liquid can be heated thus reducing the amount of energy required to evaporate the liquid. The depth of the thin layer of liquid may vary, for example, based on application. In addition, when liquids (e.g., seawater) having dissolved solids (e.g., salts) are heated, both the liquid and the solids must be heated. As evaporation occurs, the concentration of solids increases and more energy must be supplied to the liquid in order to cause evaporation. Because purification system can heat only a layer of liquid, less energy is required to heat the solids, which can allow for higher energy efficiencies in purifying liquids. These efficiencies can lead to decreased cost of potable water.

The subject matter described herein provides many technical advantages. For example, a low-cost system can be provided for converting high TDS liquids into low TDS and/or pure liquid, which, in the case the liquid is water, can be potable (e.g., sufficient for human consumption, irrigation, and the like). Because semipermeable membranes are not required, costs can be reduced. High TDS liquids can include seawater; wastewaters from wastewater treatment plants, manufacturing, and/or industrial processes; and other like liquids. There can be little to no maintenance for such systems. Noise pollution (e.g., as may be produced by large industrial plants) may be reduced or eliminated. Liquid may be purified autonomously (e.g., with no or little human interaction). In some implementations, film heating layer or elements may be biodegradable, which reduces pollution and wastes.

Unlike on-demand residential water heating systems, which warms small amounts of water within a pipe at relatively low heating temperatures, the current subject matter can heat large amounts of liquid at higher temperatures to vaporize the liquid for purification purposes.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
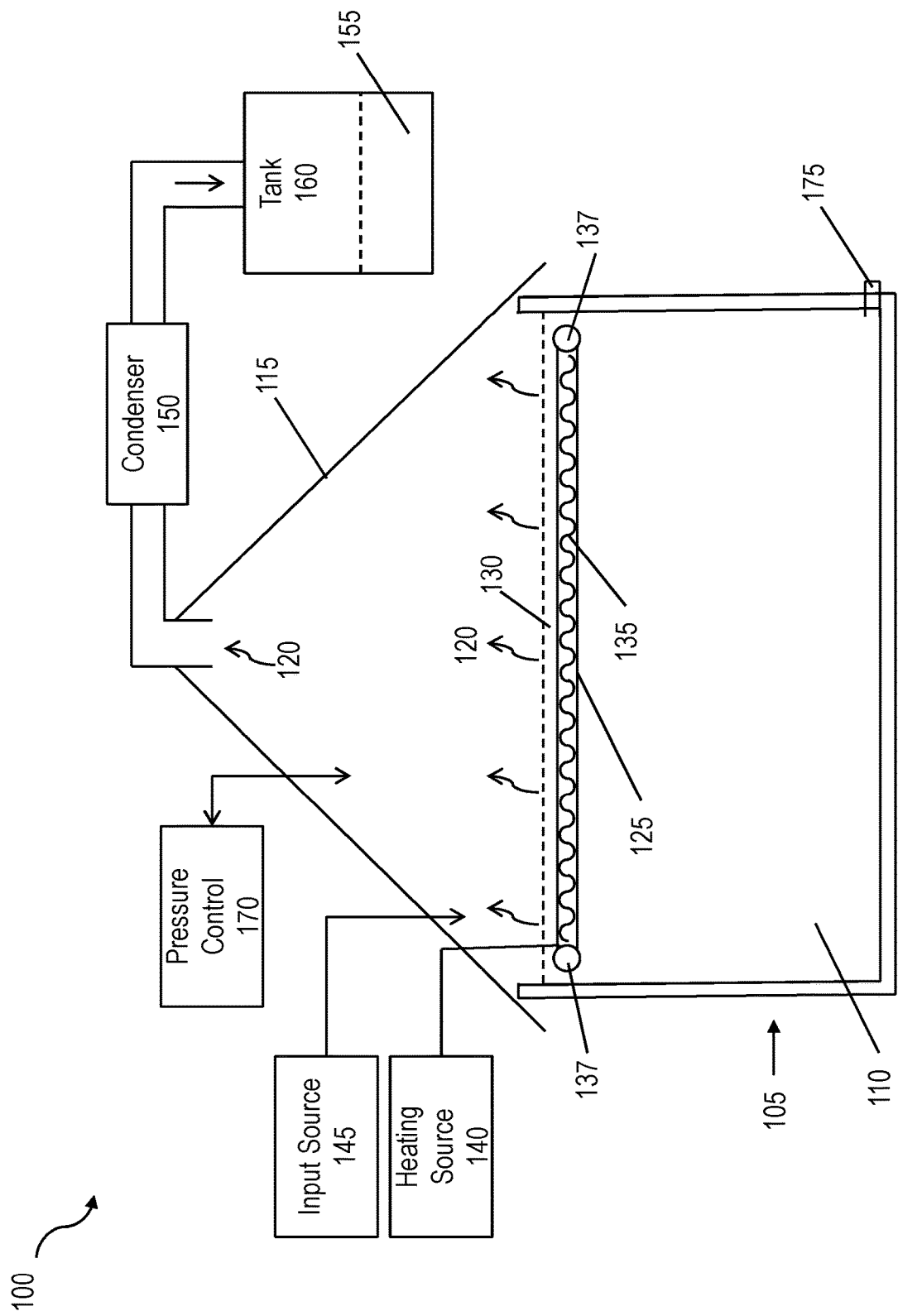
FIG. 1 is a cross sectional view of an example purification system for purifying liquids, such as seawater and/or brackish water.

FIG. 1 is a cross sectional view of an example purification system 100 for purifying liquids, such as seawater and/or brackish water, and using film heating. Because a semipermeable membrane is not required, the example purification system 100 can purify liquid at lower costs than reverse osmosis systems.

The purification system 100 can provide for efficient heating of liquid via film heating. While existing evaporation systems may use pool or nucleate heating/boiling, the current subject matter utilizes film heating, which occurs when a temperature difference between a heating element and liquid boiling point (or temperature of saturation) is greater than or equal to 93° Celsius. Rather than heating a large volume of liquid, a thin layer of liquid can be heated thus reducing the amount of energy required to evaporate the liquid. Film heating can enable evaporation of liquids using less energy than other methods. In addition, when liquids (e.g., seawater) having dissolved solids (e.g., salts) are heated, both the liquid and the solids must be heated. As evaporation occurs, the concentration of solids increases and more energy must be supplied to the liquid in order to cause evaporation. Because purification system can heat only a layer of liquid, less energy is required to heat the solids, which can allow for higher energy efficiencies in purifying liquids. These efficiencies can lead to decreased cost of potable water.

The purification system 100 can be applied to many applications, including desalinization; in wastewater treatment plants for treating wastewater such as sewage, industrial wastewater, agricultural wastewater, and the like; and other like applications.

The purification system 100 can include a vessel 105 for holding high TDS liquid 110, such as seawater and/or brackish water. The vessel 105 can include a conic or similar shaped vapor canopy 115 for collecting vapor 120 produced by the purification system 100. The vessel 105 can be formed of non-metal materials, such as plastics, functionally graded materials, and the like. The vessel 105 can be insulated or uninsulated.

Residing within the vessel 105 is heating layer 125, which can be suspended below the surface of high TDS liquid 110 so there is a liquid layer 130 of the high TDS liquid 110 above the heating layer 125. The heating layer 125 can be suspended in the high TDS liquid 110 so that it is substantially surrounded by the high TDS liquid 110, as opposed to being located at or near the bottom of the vessel 105. The heating layer 125 can be suspended using floats 137, which can be arranged to ensure there is liquid layer 130 above the heating layer 125 regardless of how full the vessel 105 is with high TDS liquid 110. Thus, in some example implementations, the heating layer 125 can raise and lower with the level of high TDS liquid 110 within vessel 105.

Heating layer 125 can include one or more heating elements 135, which can be discrete or integral with heating layer 125. Heating elements 135 can include electrical heating elements (e.g., having a high resistance such that electrical current passing through the heating elements 135 causes the temperature of the heating elements 135 to increase). A heating source 140 can be included and operatively coupled to the heating elements 135. Heating source 140 can include an electric source. In some implementations, the heating elements 135 and heating source 140 can include other means for heating, for example, heating elements 135 can include pipes circulating high or low temperature liquid, such as is produced by industrial waste processes and/or by a gas furnace. Thus, heating source 140 can include other industrial processes and/or a gas furnace. In other implementations, heating elements 135 can include a layer of infrared absorbing material and heating source 140 can include an infrared source located such that infrared light impinges the heating elements 135 and causes heating elements' 135 temperature to rise. In some implementations, solar light can be used as the heating source 140. In other implementations, heating elements 135 can include a layer of electromagnetic absorbing material and heating source 140 can include an electromagnetic generator located within vessel 105.

Purification system 100 can include input supply 145 for providing high TDS liquid 110 to vessel 105 and controlling a level of the high TDS liquid 110 within vessel 105. Input supply 145 can include a pump and/or other system as well as feedback sensors for controlling a level of the high TDS liquid 110 within vessel 105. Purification system 100 can include a condenser 150 for condensing vapor produced in vessel 105 to create purified liquid 155, which can collect in tank 160. In some implementations, the condenser 150 can be included inside vessel 105 so that vapor 120 is directed from the top of vapor canopy 115 to below the heating layer 125 in order to utilize heat exchange between the colder high TDS liquid 110 and warmer vapor 120. In some implementations, the condenser 150 is a heat exchanger.

In some implementations, purification system 100 can include pressure control 170 that can control the pressure within vessel 105. Lowering the pressure in vessel 105 can also lower the boiling point of the high TDS liquid 110. In addition, vessel 105 can include a port 175 for removing the high TDS liquid 110 and/or any precipitate generated during the purification process. In some implementations, an agitator can be included for breaking surface tension and reducing or disturbing the formation of vapor bubbles from the heating layer 125. Example agitators include an air wave generator (e.g., a fan), an ultrasound source, and the like.

Figure 2:
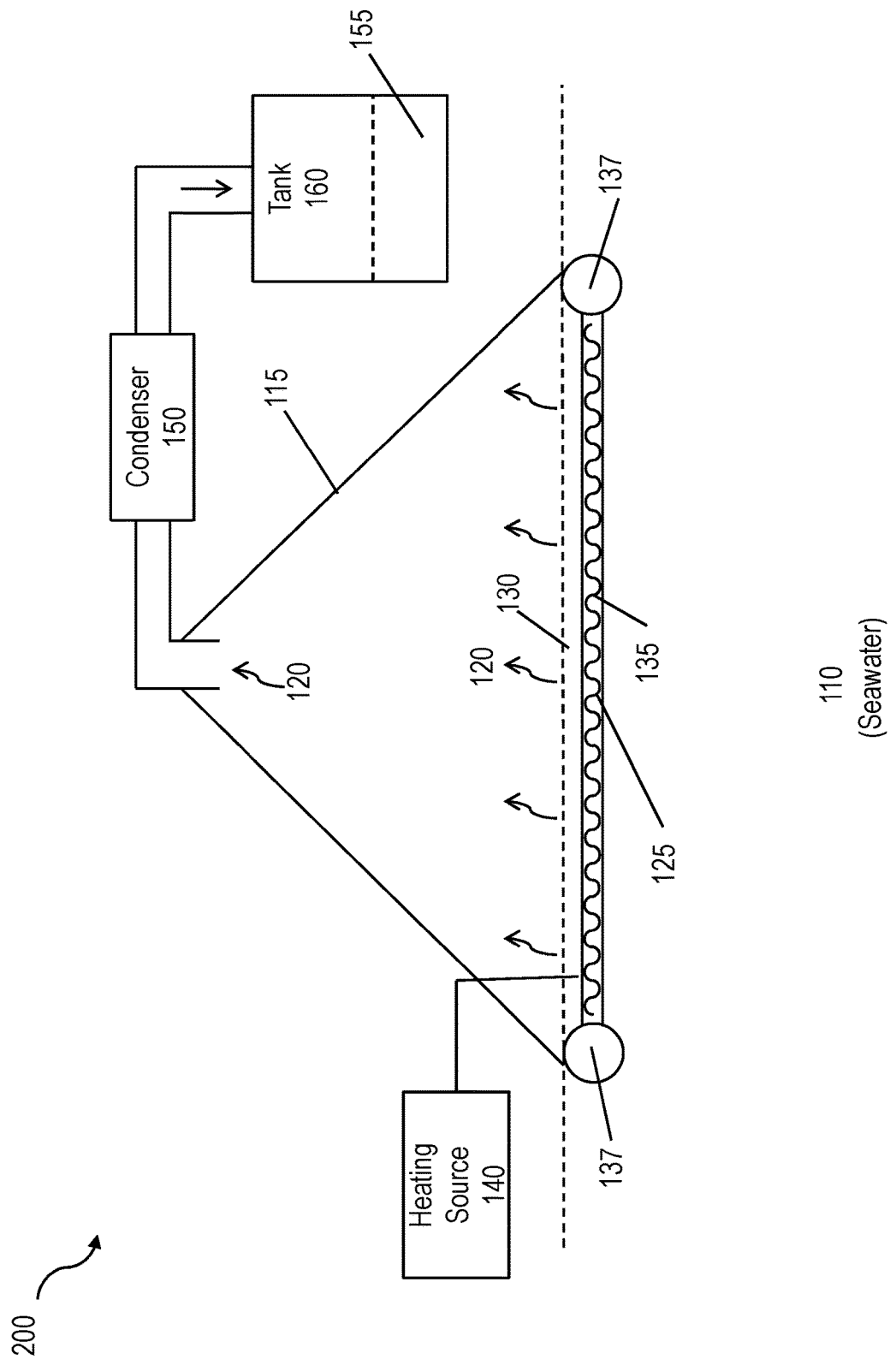
FIG. 2 is a cross sectional view of another example purification system for purifying liquids, such as seawater and/or brackish water.

FIG. 2 is a cross sectional view of another example purification system 200 for purifying liquids, such as seawater and/or brackish water. The example purification system 200 of FIG. 2 lacks vessel 105 and instead can float on the surface of a body of water (e.g., ocean, lake, and the like). In this example implementation, floats 137 can support the purification system 200, including vapor canopy 115, heating layer 125, heating source 140, condensers 150, and tank 160.

Referring again to FIG. 1, in operation, input supply 145 provides high TDS liquid 110 to purification system 100 so that there is liquid layer 130 above heating layer 125. Heating source 140 causes heating elements 135 to increase in temperature thereby heating liquid layer 130. The heating elements 135 can be brought to a temperature such that film heating occurs. Film heating occurs when a temperature difference between a heating element and liquid boiling point is greater than or equal to 93° C. Vapor 120 is produced, which exits the top of vapor canopy 115 and is condensed in condenser 150 to produce purified liquid 155. Purified liquid 155 collects in tank 160. In some implementations, surfactants can be added to high TDS liquid 110 to lower surface tension and improve evaporation efficiency.

The thickness of liquid layer 130 as well as temperature of heating elements 135 can be controlled to improve energy efficiencies of purification (e.g., reduce energy consumption per unit of purified liquid). For example, the heating layer 125 can be configured so that thickness of liquid layer 130 can vary as a function of specific gravity of the liquid. The temperature of heating elements 135 or heating layer 125 can be controlled to be greater than 93° C. above the liquid's boiling point. In some implementations, the temperature of heating elements 135 or heating layer 125 can be between 93° and 200° C. above the liquid's boiling point. In an example implementation, where the liquid is seawater, brackish water, or industrial waste water, the temperature of heating elements 135 or heating layer 125 can be at least 193° C. The boiling point of seawater may vary based on the level of TDS, but typically varies between 100° C. and 103° C., thus, the temperature of heating elements 135 or heating layer 125 can be at least 193° C., at least 194° C., at least 195° C., or at least 196° C. Other temperatures are possible.

In addition, an optimal thickness of the liquid layer 130 (e.g., the depth of heating layer 125) can depend upon water and air (psychrometric) conditions, including free surface; TDS; temperature (bulk/dry/wet bulb); boundary layer velocity; and relative humidity. In some implementations, the optimal thickness ranges from 1 mm to 20 mm, from 5 mm to 14 mm, or adjusted according to the desired evaporation rate, for example, using sensors, a controller, and a feedback system. The optimal thickness can include about 1, 2, 3, 4, 5, 6, 7, 8, 9, 10, 11, 12, 13, 14, 15, 16, 17, 18, 19, and/or 20 millimeters. In some implementations, a thermoelectric cooler/heater (TEC) can be utilized for precise thermal energy transfer to the vapor (Kinetic energy is characterized by $KE=3/2k*T$, where k is Boltzman constant and T is temperature). While the depth of heating layer 125 can be 20 mm or less from the surface of the liquid, in some implementations, the heating layer 125 can have an area of 0.1 square meters or greater, for example, 10 square meters.

In some implementations, film heating results in a thin film of vapor bubbles on the heating layer 125, also known as the Leidenfrost effect. This film of vapor can affect evaporation efficiencies because the vapor film can reduce the effective surface area of the heating layer 125 thereby keeping that liquid from forming vapors rapidly. In some implementations, a charging plate or element can be included with the heating elements 135 to impart a charge on liquid and/or vapor molecules in proximity to the heating layer 125. In combination with an oppositely charged plate arranged within purification system 100, charging of liquid and/or vapor molecules can result in the charged liquid and/or vapor molecules being pulled away from heating layer 125 thereby avoiding formation of a vapor film.

Figure 3:
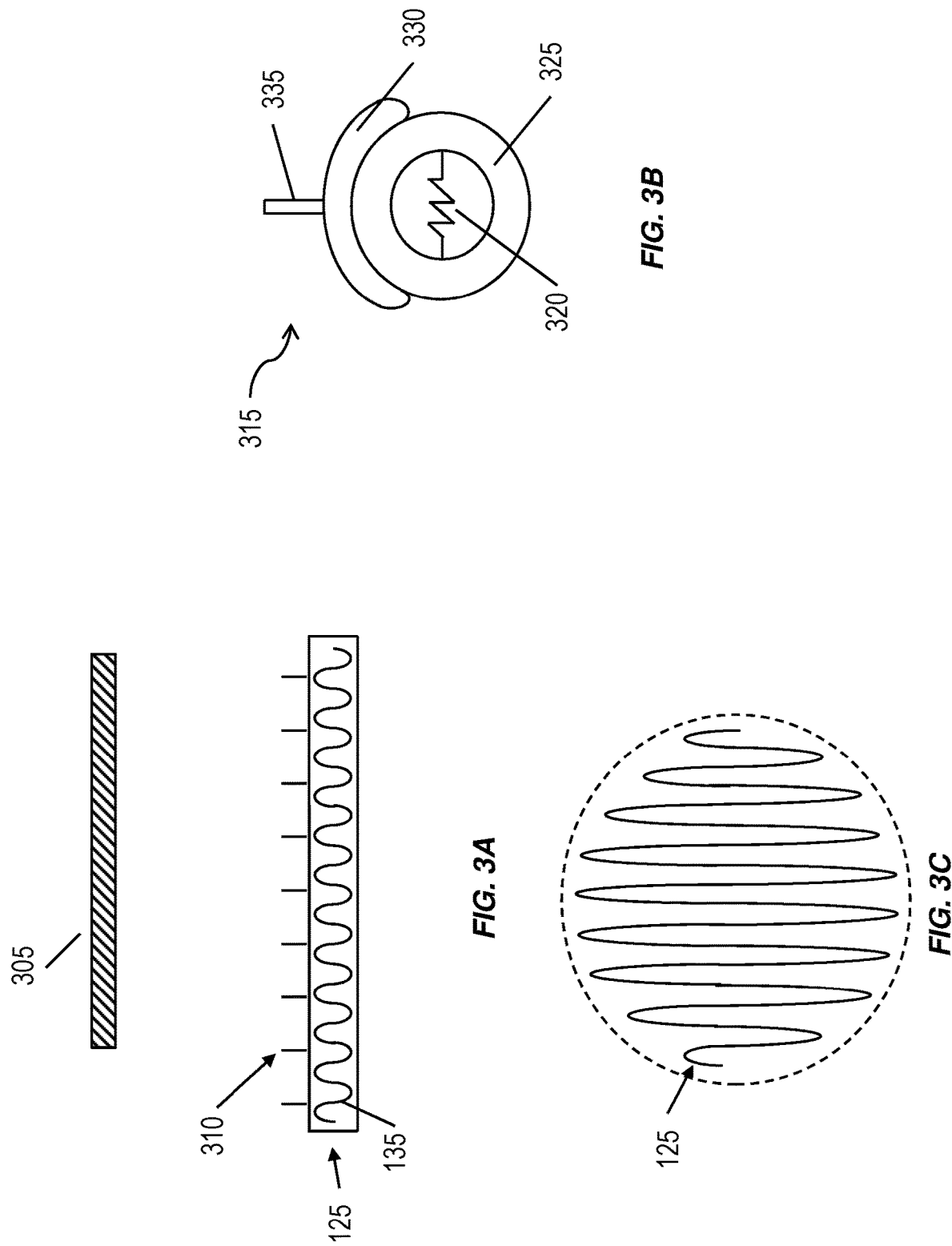
FIG. 3A is a cross-sectional view of a portion of heating layer and an opposite charged plate.
FIG. 3B is a cross-sectional view of an example implementation of a hybrid heating-charging element.
FIG. 3C is a top view of an example heating layer.

FIG. 3A is a cross-sectional view of a portion of heating layer 125 and an opposite charged plate 305. The heating layer 125 can include a charging element 310. The charging element 310 can impart a charge to the polar liquid and/or vapor molecules, which subsequently become attracted to the opposite charged plate 305. The movement of the liquid and/or vapor molecules can prevent formation of a vapor film. The opposite charged plate may be located near the condenser, for example, at or near the top of the vapor canopy 115. In some implementations, a similarly charged plate can be located adjacent the heating layer 125 such that when water molecules become charged, they are repelled from the similarly charged plate.

In some implementations, the heating layer 125 can include a hybrid heating-charging element that can impart both heat and charge to water molecules. FIG. 3B is a cross-sectional view of an example implementation of a hybrid heating-charging element 315. The hybrid heating-charging element 315 includes a heating element 320, which can be thermo-electric or based on another heating means, a tube layer 325, an insulation layer 330, and a charging plate or fin 335. In some implementations, the insulation layer 330 is electrically insulating while thermally conductive.

In some implementations, heating layer 125 can include a top plate. In some implementations, the heating layer 125 is formed from a tube or pipe. FIG. 3C is a top view of an example heating layer 125. A tube or pipe runs over the effective coverage area. Tubes or pipes can be used in some implementations to increase the surface area that the heating layer 125 has to the surrounding liquid, as compared to a plate implementation.

Heat is needed to provide enough energy for the molecules of the high TDS liquid 110 to vaporize. The energy needed can be expressed as an excess thermodynamic potential of the water in the solution. The process requires enough energy to remove the water from the solution and to supply the heat of evaporation. When removing the water, more than 99% of the energy needed goes towards supplying the heat of evaporation. The need to overcome the surface tension of the solution can also require energy. The energy requirement of this process can be very high because a phase transition must occur for the water to go from a liquid to a vapor.

Figure 4:
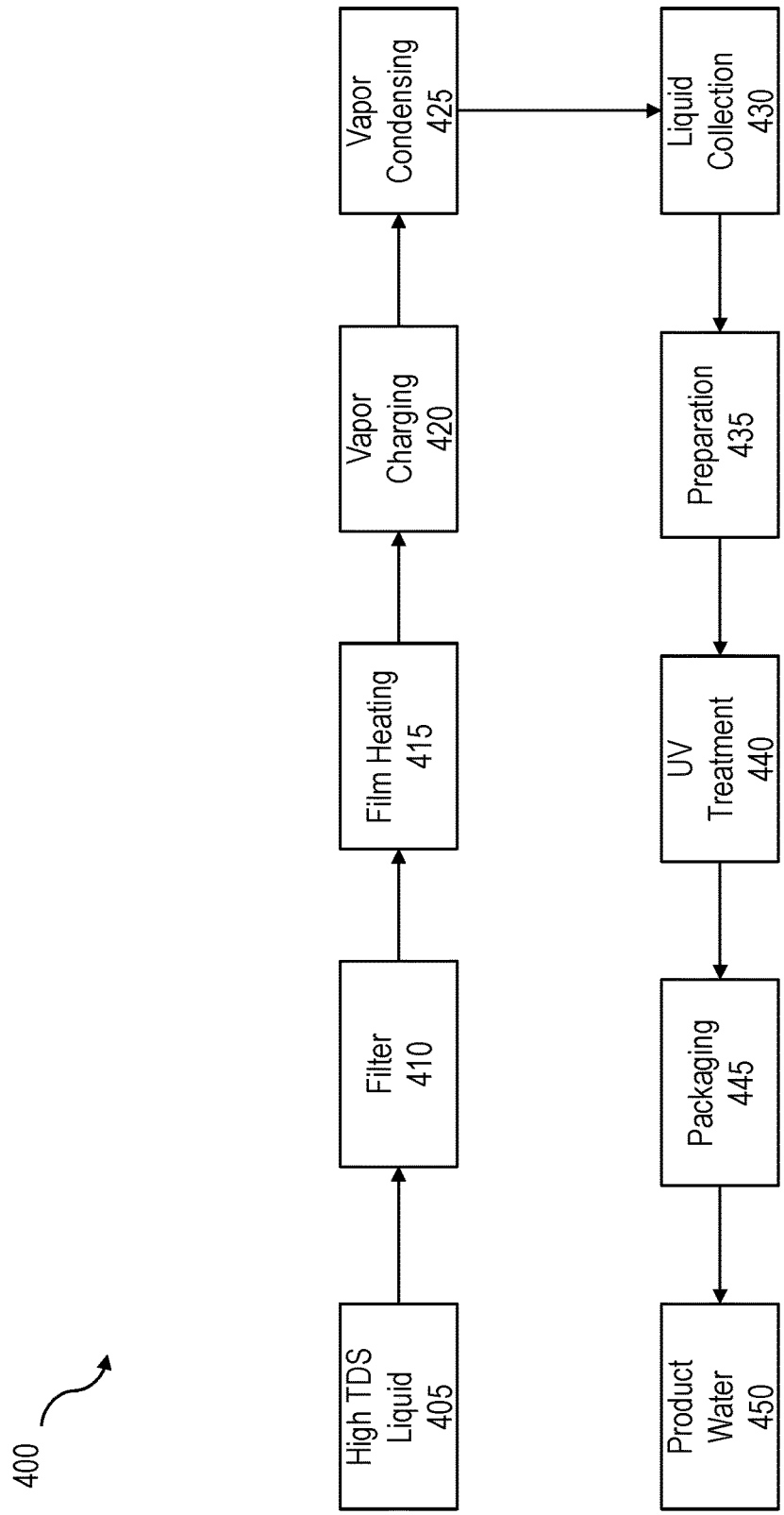
FIG. 4 is a process flow diagram illustrating an overview of an example process for purifying liquid.

In general, an evaporation process can be described with reference to FIG. 4, which is a process flow diagram 400 illustrating an overview of a process for purifying liquid, and in particular, purifying water. The process can include using film heating, which can, according to some aspects of the current subject matter, provide for low-cost and high efficiency purification.

At 405, high TDS liquid, such as seawater and/or brackish water, can be provided. Seawater generally has an average salinity of 35000 part per million (ppm), although salinity may vary, for example, based on a depth in the ocean from which the seawater is acquired. Seawater may be provided via a pump or other system. At 410, the high TDS liquid can be filtered. Filtering can remove large objects or other debris from the high TDS liquid. In some implementations, the high TDS liquid does not need to be filtered.

At 415, film heating can raise the temperature of the high TDS liquid to cause evaporation, which produces vapors. At 420, the vapors can be charged, for example, using a charging element to avoid formation of a vapor layer on heating elements. At 425, the vapors can be condensed and at 430 collected (for example, in a tank). At 435, the collected liquid can be prepared/dosed, which can include TDS balancing. This may include introducing TDSs including calcium, magnesium, chlorides, sulfates, and the like (e.g., softening water). At 440, the collected liquid can be treated with ultraviolet radiation to disinfect the collected liquid. At 445, the water is suitable for packaging and/or transport, which results in product water 450.

In general, evaporation is vaporization of a liquid (e.g., surface film) into a gaseous phase. On the molecular level, there is no boundary (strict separation) between the liquid state and vapor state. The rate of evaporation can depend upon the factors affecting water molecules (e.g., surface). The kinetic energy of a molecule is proportionate to its temperature, for example, faster or high-energy molecules escapes easily compared to slower or low energy molecules.

Figure 5:
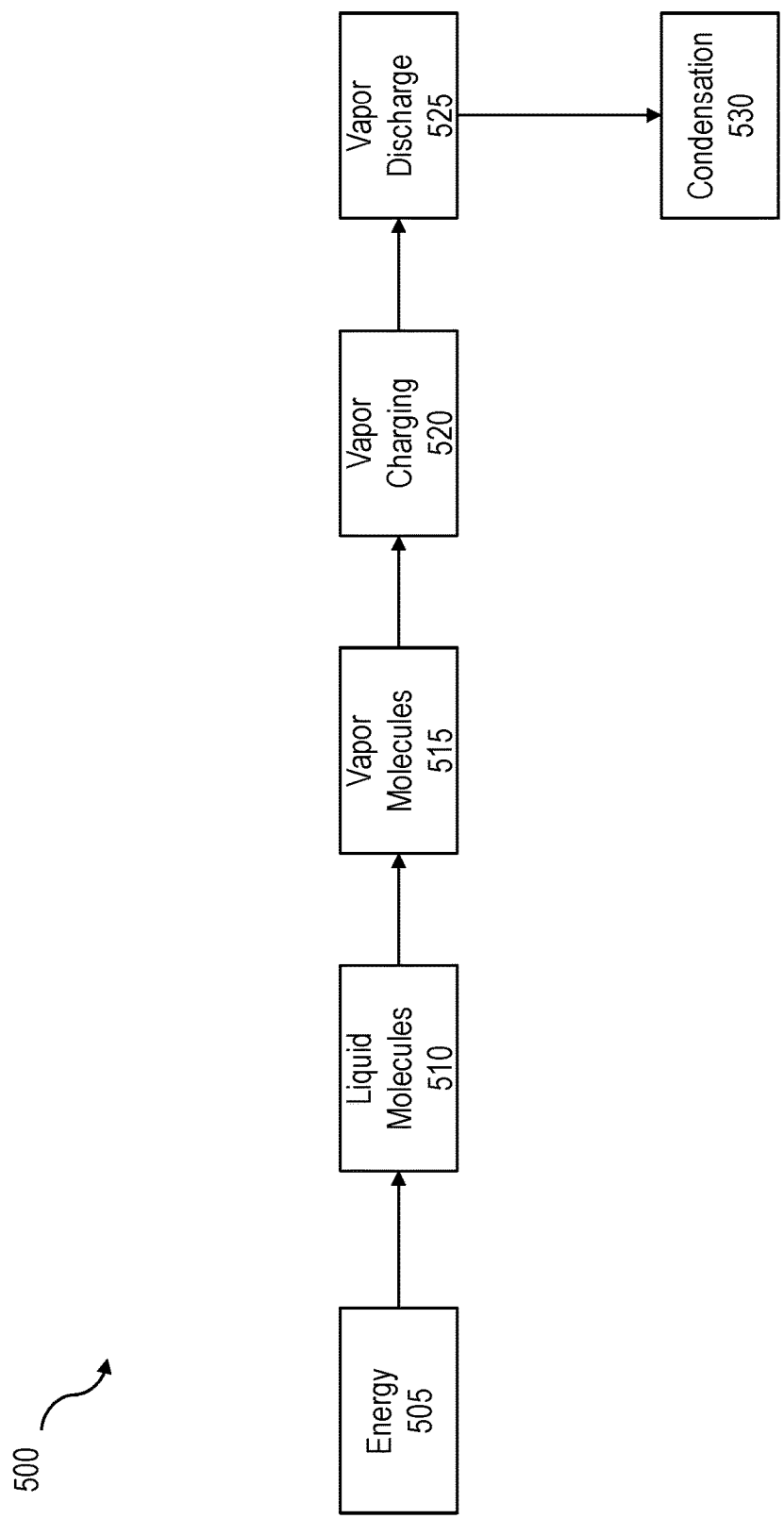
FIG. 5 is a process flow diagram illustrating stages of evaporation and condensation.

Therefore, the evaporation rate can be at least a function of temperature; surface area; pressure; air movement; and/or vapor removal from surface boundary; and surface tension (e.g., inter molecular forces, concentration, emissivity, etc.). FIG. 5 is a process flow diagram 500 illustrating the stages of evaporation and condensation. Input energy 505 is applied to liquid molecules at 510. This increases the kinetic energy, including temperature, volume, and pressure of the liquid. At 515, molecules escape from the liquid as vapor. These vapors can be charged at 520 and discharging at 525. The vapor can, at 530, condense and return to liquid phase.

In general, vaporization of a liquid from a heated surface (e.g., the change of phase from liquid to gas) can occur in three different ways: pool boiling, nucleate boiling, and film boiling. Pool boiling is a convective heat transfer in which few or no bubbles form and the temperature of the heating element is approximately the boiling point of the high TDS liquid (e.g., saturation). Nucleate boiling is a complex heat transfer process in which vapor bubbles form and the temperature of the heating element is greater than the boiling point of the high TDS liquid (e.g., vaporization). Film boiling creates a film of vapor covering the heating element surface and occurs when the temperature difference of the heating element and boiling point is greater than or equal to 200° F. (93° C.).

Figure 6:
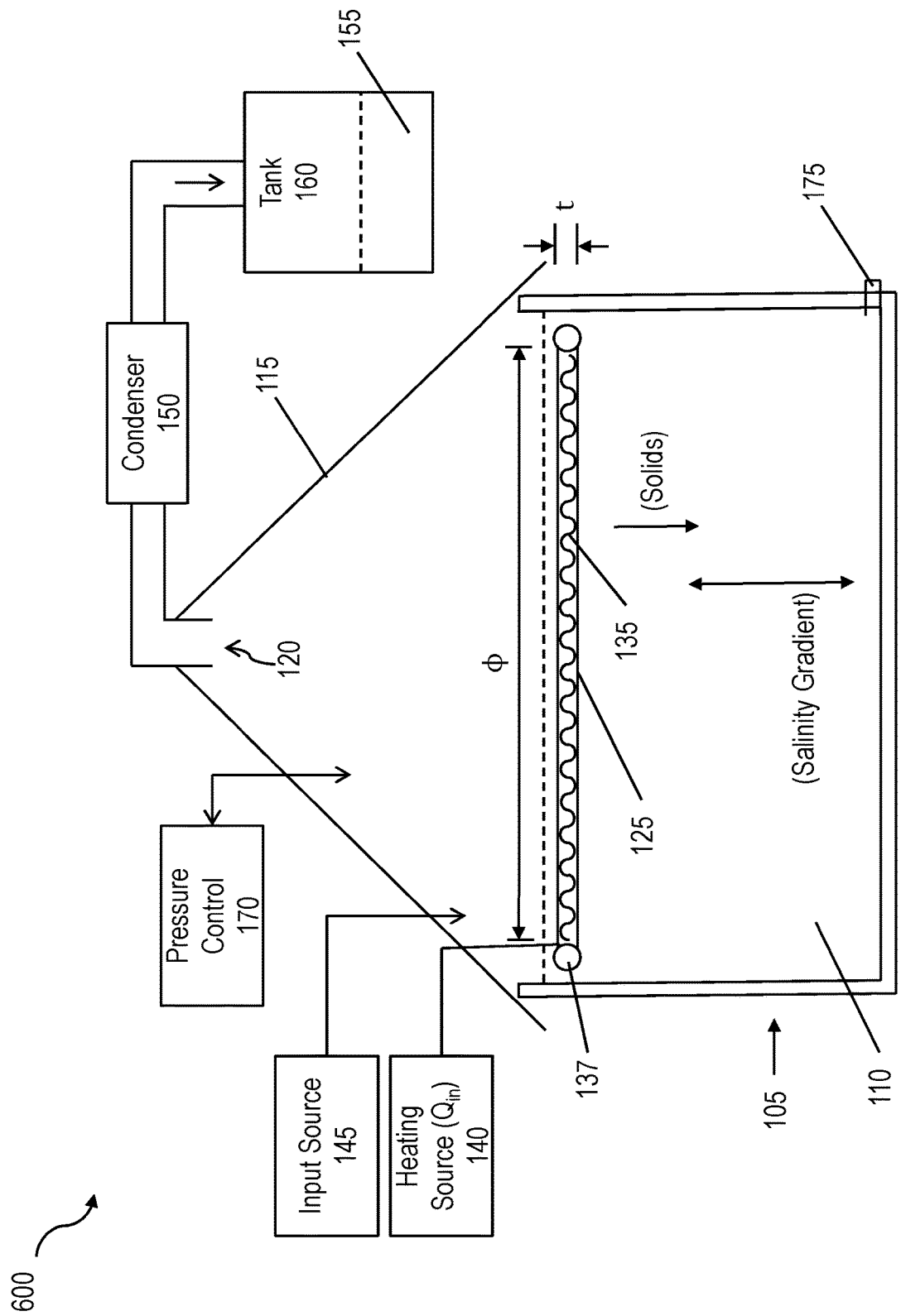
FIG. 6 is a cross sectional view of the example purification system with additional notations.

The example purification systems 100 and 200 can be operated in a manner such that film heating occurs by controlling the temperature of heating layer 125 and heating elements 135. FIG. 6 is a cross sectional view of the example purification system 100 with additional notations. Solids precipitate out of the high TDS liquid 110 and a gradient of salinity occurs. The volume of the heating layer 125 can be expressed as $$V = At$$
$$V = \pi\left(\frac{\phi}{2}\right)^2 t$$
$$V = \frac{\pi}{4}\phi^2 t$$

$\phi$=diameter of heating layer
t=thickness of heating layer

Water is a polar molecule and is good at dissolving substances like salts (which are ionic). In addition, water is a bad conductor of heat and a good conductor of electricity (dissolved solids/electrodes (sodium chloride (NaCl), and the like). Seawater TDS is 35,000 parts per million (ppm) while freshwater has 50 to 500 ppm. Lastly, evaporation is an endothermic process.

Figure 7:
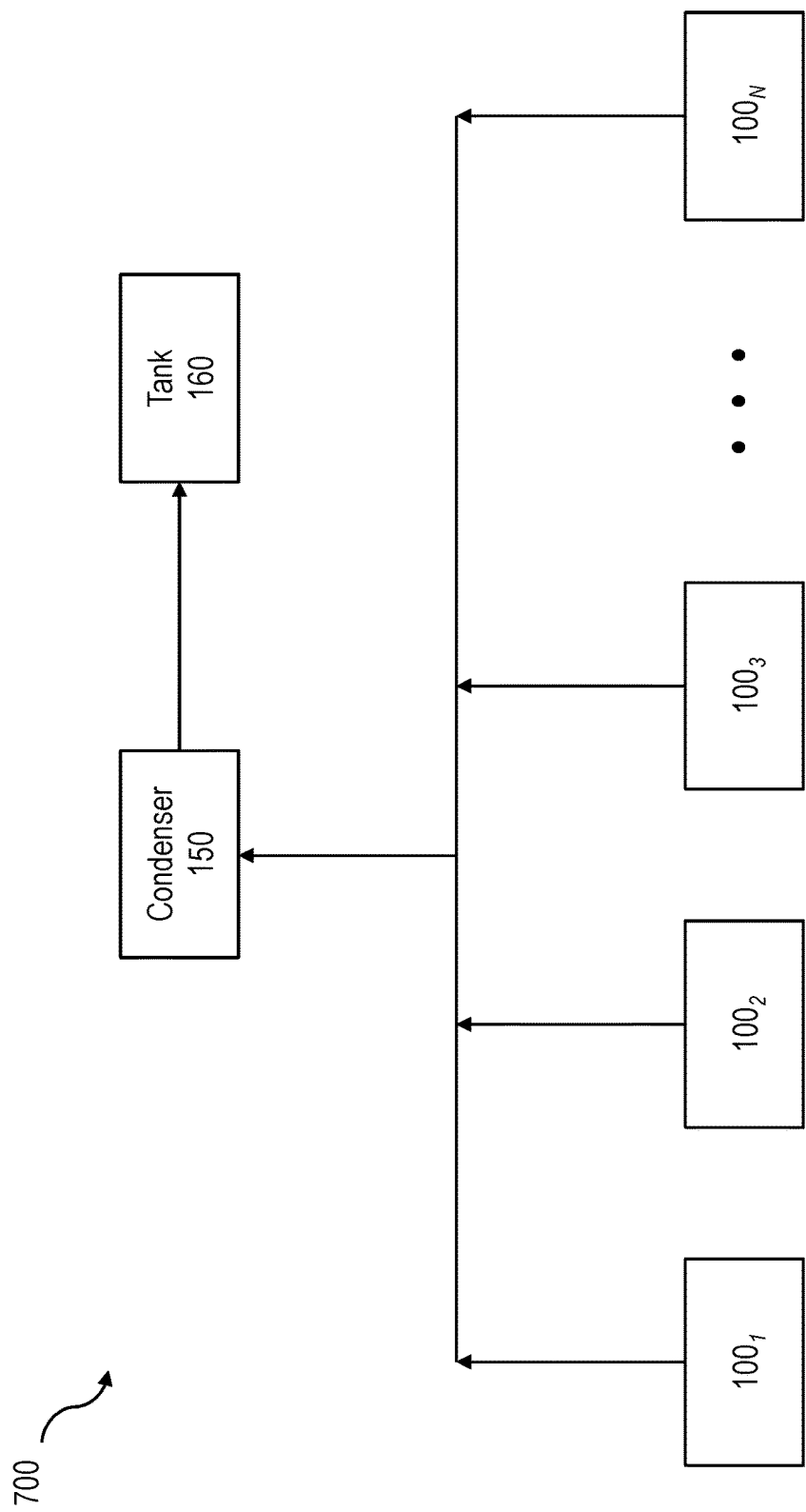
FIG. 7 is a system block diagram illustrating a system with parallel purification systems.

Some implementations of the current subject matter can scale according to the intended application. For example, FIG. 7 is a system block diagram illustrating a system 700 with parallel purification systems 100, (i=1, 2, . . . , N). N purification systems can share a common tank 160 so that condensed liquid from each purification system 100, collects in the common tank 160. In some implementations, each purification system 100, can share a common condenser 150 so that each purification system 100, produces vapor, which is condensed by the common condenser 150 and collected in the common tank 160. The purification systems 100, can have separate heating means (e.g., heating can be based on gas, electricity, and radiation/light). Other configurations are possible.

With respect to energy, heat input to the purification system 100 via heating elements 135 is substantially equal to the heat absorbed by the high TDS liquid 110.

Heat input by heating elements 135 can be expressed as $P = V \times I$

Power = Voltage × Current

Voltage = Current × Resistance $V = IR$ $P = I^2 R$

Energy: $\left(\dfrac{P}{t}\right) = \dfrac{I^2 R}{t}$ $Q_L = H_W \times m_W$ (latent heat of vaporization)

$H_w = \text{latent heat} = 2260 \dfrac{\text{kJ}}{\text{kg}}$ $Q_T = Q_L + Q_S$ The heat absorbed by the high TDS liquid can be expressed as $Q_T = Q_L + Q_S$ $Q_S = m \times c_W \times \Delta_T$ $\Delta T = T_{DESIGN} - T_{AMB}$ $m_W = \rho_W V_W$ $V_W$ = volume of water
$\rho_W$ = density of water
$m_W$ = mass of water (film to be evaporate)

$m_w = \rho_w \dfrac{t_w \phi^2}{4}$

Thus density in kg/m³ can be expressed as:

$\rho(S, T) =$
$\rho_w = \rho_{w_0} + (8.24493 \times 10^{-1} - 4.0899 \times 10^{-3} T - 7.6438 \times 10^{-5} T^2 -$
$8.2467 \times 10^{-7} T^3 + 5.3875 \times 10^{-9} T^4) S +$
$(-5.72466 \times 10^{-3} + 1.0227 \times 10^{-4} T - 1.6546 \times 10^{-6} T^2) S^{3/2} +$
$4.8314 \times 10^{-4} S^2$ Salinity (S), which is mass of salt per unit mass of seawater, in percentage can be expressed as:

$S = a_0 + a_1 k_{15}^{1/2} + a_2 k_{15} + a_3 k_{15}^{3/2} + a_4 k_{15}^2 + a_5 k_{15}^{5/2}$ $a_0 = 0.0080$
$a_1 = -0.1793$
$a_2 = 25.2851$
$a_3 = 14.0941$
$a_4 = -7.0261$
$a_5 = 2.7081$
$k_{15}$ = electrical conductivity seawater at 15° C.

Seawater's specific heat, which is the amount of heat per unit mass required to raise the temperature by one degree Celsius, in joules/kg°k, can be expressed as:

$$c_p(S, T) = \sum_{i=0}^{4} a_i T^i + S \sum_{i=0}^{2} b_i T^i + S^{3/2} \sum_{i=0}^{2} c_i T^i$$

$a_0 = 4.2174 \times 10^3$
$a_1 = -3.720283$
$a_2 = 0.1412855$
$a_3 = -2.654387 \times 10^{-3}$
$a_4 = -2.093236 \times 10^{-6}$
$b_0 = -7.643575$
$b_1 = 0.1072763$
$b_2 = -1.38385 \times 10^{-3}$
$c_0 = 0.1770383$
$c_1 = -4.07718 \times 10^{-3}$
$c_2 = 5.148 \times 10^{-5}$ The evaporation rate can be expressed as:

Evaporation rate $(E_v) = \theta \times A \times (x_s - x)$ $\theta$ = evaporation coefficient $\left(\dfrac{\text{kg}}{\text{m}^2 \text{h}}\right)$ $A$ = water surface area (m²)

$x_s$ = humidity ratio in saturated air $\left(\dfrac{\text{kg}}{\text{kg}}\right)$ $x$ = humidity ratio in ambiant air $\left(\dfrac{\text{kg}}{\text{kg}}\right)$ $Q_R = E_V h_w$ $h_w$ = latent heat of vaporization = $2260 \dfrac{\text{kJ}}{\text{kg}}$ $Q_R$ = heat required = $\dfrac{VI}{t}$ $HHV_{Methane} = 52.22 \dfrac{\text{Mj}}{\text{kg}}$ $\rho_{methane} = \dfrac{0.6797 \text{ kg}}{\text{m}^3}$ $E_v = \dfrac{Q_R}{h_w} = \theta \times A \times (x_s - x)$ Thus, vaporization equations can be expressed as:

$h_0 = C(T_s - T_{sat,v})^\eta$ $h_p = h_0 \left(\dfrac{p_{actual}}{p_{std,actual}}\right)^{2/5}$ Where

| Q/A | C | η |
|---|---|---|
| <16 | 1042 | ⅓ |
| 16 to 240 | 5.56 | 3 |

$a = \dfrac{Q}{A}$ $$317\left(\frac{1\text{ kW}}{\text{m}^2}\right) = 1\left(\frac{\text{BTU}}{\text{hr ft}^2}\right)$$

$$1\frac{w}{\text{m}^2 \cdot k} = 5.6783\left(\frac{\text{BTU}}{\text{hr ft}^2 \cdot °\text{F.}}\right)$$

With respect to the effect of radiation on evaporation film coefficients, temperatures of the heating elements 135 are likely to be high so the effects of radiation can be considered. Radiation increases the vapor film thickness (i.e., the vapor film is the layer of vapor that forms around heating elements), reducing the values of the film coefficient and convective heat transfer. This effect can be expressed as:

$$h_{total} = h_b\left(\frac{h_b}{h_{total}}\right)^{\frac{1}{3}} + h_r(\text{per iteration})$$

In which total heat transfer in film boiling can be expressed as:

$$Q = qA = h_{total}A(T_S - T_{sat})$$

$h_r$ = radiation film coefficient
$h_{total}$ = total film coefficient=Convective and radiation heat transfer
And $$h_b = 0.62\left(\frac{\rho_v(\rho_l - \rho_v)g(h_{fg} + 0.4c_{\rho,v}(T_S - T_{sat,v}))k_v^3}{d\mu_v(T_S - T_{sat,v})}\right)^{1/4}$$

In which all properties can be evaluated at the saturation temperature corresponding to the vapor pressure. In addition, $k$ = thermal conductivity $\left(\frac{w}{mk}\right)$ or $\left(\frac{\text{BTU}}{\text{hr ft}^2 \cdot °\text{F.}}\right)$ $v_{subscript}$ = vapor (subscripts: $s$ = surface; sat = saturation;

$\infty$ = infinity; $f$ = film; $b$ = boiling; $l$ = liquid)

$d$ = diameter (m) or (ft)

$A$ = area (m$^2$) or (ft$^2$)

$Q$ = heat transfer rate ($w$) or $\left(\frac{\text{BTU}}{\text{hr}}\right)$ $\mu$ = viscisity $\left(\frac{\text{kg}}{\text{sm}}\right)$ or $\left(\frac{\text{lb}}{\text{hr ft}}\right)$ $g$ = gravity $\left(\frac{\text{m}}{\text{s}^2}\right)$ or $\left(\frac{\text{ft}}{\text{s}^2}\right)$ $\rho$ = density $\left(\frac{\text{kg}}{\text{m}^3}\right)$ or $\left(\frac{\text{lb}}{\text{ft}^3}\right)$ $h$ = film coefficient $\left(\frac{w}{\text{m}^2 \cdot k}\right)$ or $\left(\frac{\text{BTU}}{\text{hr ft}^2 \cdot °\text{F.}}\right)$ $c_p$ = specific heat $\left(\frac{\text{J}}{\text{kg} \cdot °\text{k}}\right)$ or $\left(\frac{\text{BTU}}{\text{lbs} \cdot °\text{F.}}\right)$ $T_\infty$ = bulk temperature (° k) or (° F.)

Figure 8:
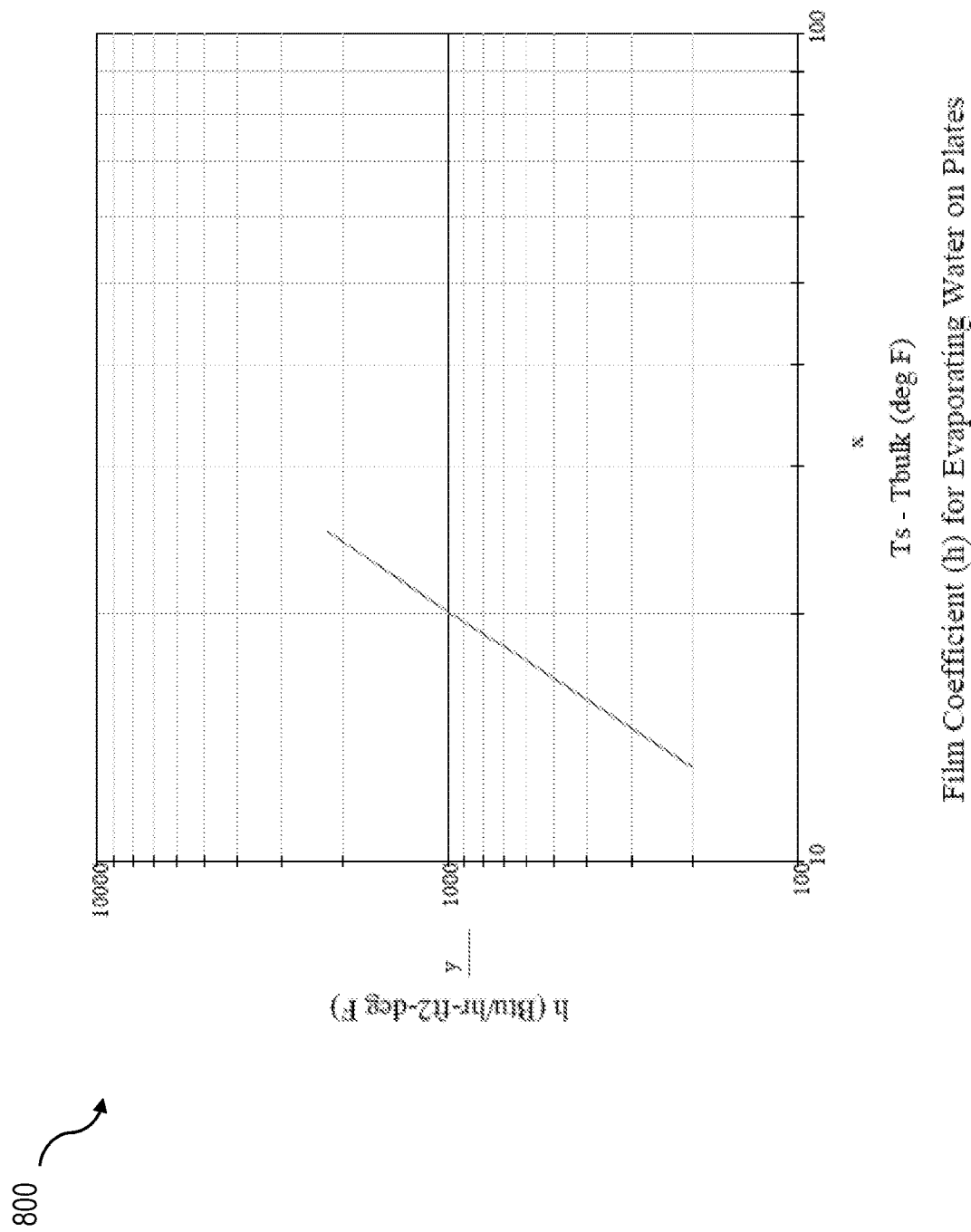
FIG. 8 is a graph of film coefficient versus film temperature illustrating characteristics of seawater evaporation from a flat plate.

FIG. 8 is a graph of film coefficient versus film temperature illustrating characteristics of seawater evaporation from a flat plate. The illustrated values are:

| Ts-Tbulk (° F.) | h (Btu/hr-ft2-° F.) |
| --- | --- |
| 13 | 200 |
| 14.5 | 300 |
| 17.5 | 600 |
| 20 | 1000 |
| 25 | 2200 |

As described above, if a liquid is vaporizing from a heated surface, the change of phase can occur in three ways. In pool boiling, the temperature of the heating element is approximately equal to the temperature of liquid boiling/saturation. In nucleate boiling, the temperature of heating element is greater than the temperature of boiling/vaporization. In film boiling, the temperature different between the heating element and the temperature of liquid boiling/vaporization is greater than 200° f or 93° C.

The film coefficient for natural convection can be expressed as:

$$h_{H2O} = 4500 - 11300\left(\frac{w}{\text{m}^2 \cdot K}\right)$$

$$\text{or } 800 - 2000\left(\frac{\text{BTU}}{\text{hr ft}^2 \cdot °\text{F.}}\right)$$

Film Temperature $T_h = \frac{1}{2}(T_S + T_\infty)$

Although a few variations have been described in detail above, other modifications or additions are possible. For example, although examples described herein refer to desalination, the current subject matter is not limited to desalination and can apply to purification of any liquid material including for desalinization; in wastewater treatment plants for treating wastewater such as sewage, industrial wastewater, agricultural wastewater, and the like; and other like applications.

In addition, the heating layer 125 can be suspended within the high TDS liquid 110 using a number of methods in addition to floats 137, for example, by affixing heating layer 125 to a side of vessel 105 and controlling the volume of the high TDS liquid 110 to ensure the presence of the liquid layer 130. Further, the size and area of heating layer 125 can vary, as well as the principle of operation for heating (e.g., gas, electric, waste processes, infrared radiation, solar radiation, electromagnetic radiation, and the like).

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus for liquid purification, the apparatus comprising:
    a vapor canopy for collecting vapor;
    a heating layer below the vapor canopy and adapted to be submerged within a liquid such that it is substantially surrounded by the liquid and located at a depth between 1 millimeter and 20 millimeters from a surface of the liquid, the heating layer adapted to be heated to a temperature of at least 93 degrees Celsius greater than a boiling point of the liquid, wherein the heating layer includes a charging element that imparts a first charge on liquid or vapor molecules in proximity to the heating layer;
    an oppositely charged element disposed at a top of the vapor canopy and configured to pull charged vapor molecules away from the heating layer and resist formation of a vapor film on the heating layer;
    a vessel for holding the liquid;
    an agitator configured to break a surface tension of the liquid and reduce or disturb the formation of vapor bubbles from the heating layer, wherein the agitator is arranged within the vessel; and
    a float coupled to the heating layer and suspending the heating layer within the liquid so that the depth of the heating layer remains substantially constant regardless of a volume of the liquid.

2. The apparatus of claim 1, wherein the heating layer is contained within the vessel.

3. The apparatus of claim 1, wherein the float further couples to the vapor canopy and supports the vapor canopy over the liquid, wherein the vapor canopy is adapted to float on a body of water.

4. The apparatus of claim 1, wherein the heating layer comprises at least one heating element, the heating element including an electrical heating element, a gas heating element, a forced hot liquid heating element, an infrared absorbing material, or an electromagnetic absorbing material.

5. The apparatus of claim 1, wherein a similarly charged element is disposed adjacent to the heating layer to repel the charged liquid or vapor molecules.

6. The apparatus of claim 1, wherein the heating layer includes a hybrid heating-charging element comprising:
    a heating element;
    a charging fin as the charging element; and
    an insulation layer between the heating element and the charging fin, wherein the insulation layer is electrically insulating and thermally conductive.

7. The apparatus of claim 1 further comprising a heating source including an infrared source, an electromagnetic source, or an electric source.

8. The apparatus of claim 7, wherein the heating source includes an infrared source and the heating layer includes an infrared absorbing material.

9. The apparatus of claim 1, wherein the liquid is sea water, waste water, or brackish water.

10. The apparatus of claim 1, wherein the heating layer is adapted to be heated to a temperature of at least 193 degrees Celsius.

11. The apparatus of claim 1, further including an input supply adapted to control a surface level of the liquid.

12. The apparatus of claim 1, wherein the heating layer is adapted to be submerged within the liquid at a depth between 5 millimeters and 14 millimeters from a surface of the liquid.

13. The apparatus of claim 1, wherein the heating layer is adapted to be submerged within the liquid at a depth of about 14 millimeters.

14. The apparatus of claim 1, further comprising a tube layer arranged between an insulation layer and a heating element.

15. The apparatus of claim 1, further comprising:
    a port arranged on the vessel configured to remove a high TDS liquid and/or precipitate, wherein the port is arranged at a location on the vessel at a depth that is vertically lower than the depth of the heating layer;
    a pressure control configured to control the pressure within vessel; wherein the pressure control is arranged on the vapor canopy;
    a tank configured to collect a purified liquid which passes through the vapor canopy as vapor molecules, wherein the tank is arranged outside of the vessel; and
    a condenser arranged between the vapor canopy and the tank, wherein the condenser is configured to condense the vapor molecules from the vapor canopy to the purified liquid to be stored in the tank.

16. The apparatus of claim 1, wherein the heating layer is configured so that a thickness of a liquid layer above the heating layer varies as a function of a specific gravity of the liquid.

17. The apparatus of claim 1, wherein the heating layer includes a thermoelectric cooler.

18. The apparatus of claim 1, wherein the heating layer includes pipes circulating liquid.

19. The apparatus of claim 1, further comprising an insulation layer arranged between and abutting both the heating layer and the charging element.

20. A method comprising:
    providing a high total dissolved solids (TDS) liquid to an apparatus including a heating layer arranged below a vapor canopy such that the heating layer is submerged within the high TDS liquid such that it is substantially surrounded by the high TDS liquid and located at a depth between 1 millimeter and 20 millimeters from a surface of the high TDS liquid;
    heating the heating layer to a temperature of at least 93 degrees Celsius greater than a boiling point of the high TDS liquid to create vapor; and
    collecting the vapor with the vapor canopy and a condenser;

wherein the apparatus includes:
  the vapor canopy;
  the heating layer, wherein the heating layer includes a charging element that imparts a first charge on liquid or vapor molecules in proximity to the heating layer;
  an oppositely charged element disposed at a top of the vapor canopy and configured to pull charged vapor molecules away from the heating layer and resist formation of a vapor film on the heating layer;
  a vessel for holding the liquid;
  an agitator configured to break a surface tension of the liquid and reduce or disturb the formation of vapor bubbles from the heating layer, wherein the agitator is arranged within the vessel; and
  a float coupled to the heating layer and suspending the heating layer within the liquid so that the depth of the heating layer remains substantially constant regardless of a volume of the liquid.

21. The method of claim 20, further comprising:
  charging the vapor using the charging element to avoid formation of the vapor film on the heating layer.

22. The method of claim 20, wherein the heating layer is submerged within the liquid at a depth of about 14 millimeters.

23. The method of claim 20, wherein the heating layer includes a hybrid heating-charging element comprising:
  a heating element;
  a charging fin; and
  an insulation layer between the heating element and the charging fin, wherein the insulation layer is electrically insulating and thermally conductive.

24. The method of claim 20, wherein providing a high total dissolved solids (TDS) liquid includes placing the vapor canopy and heating element in a body of sea water.

* * * * *